(12) United States Patent
Chow

(10) Patent No.: US 11,027,764 B2
(45) Date of Patent: Jun. 8, 2021

(54) VEHICLE DRIVING MODE SAFETY SYSTEM

(71) Applicant: Toyota Motor Engineering & Manufacturing North America, Inc., Plano, TX (US)

(72) Inventor: Justin J. Chow, Ann Arbor, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 0 days.

(21) Appl. No.: 16/020,885

(22) Filed: Jun. 27, 2018

(65) Prior Publication Data
US 2020/0001910 A1    Jan. 2, 2020

(51) Int. Cl.
| | |
|---|---|
| *B62D 1/04* | (2006.01) |
| *B62D 6/00* | (2006.01) |
| *B60W 40/08* | (2012.01) |
| *B62D 15/02* | (2006.01) |
| *B60W 50/08* | (2020.01) |
| *B60N 2/00* | (2006.01) |
| *B60W 50/00* | (2006.01) |

(52) U.S. Cl.
CPC ............. *B62D 1/046* (2013.01); *B62D 6/007* (2013.01); *B60N 2/002* (2013.01); *B60W 40/08* (2013.01); *B60W 50/0098* (2013.01); *B60W 50/085* (2013.01); *B62D 15/025* (2013.01)

(58) Field of Classification Search
CPC .................................................... B62D 1/046
USPC ........................................................ 701/36
See application file for complete search history.

(56) References Cited

U.S. PATENT DOCUMENTS

| | | | |
|---|---|---|---|
| 6,219,603 B1* | 4/2001 | Yamamoto | B62D 5/008 180/444 |
| 6,744,232 B2* | 6/2004 | Endo | B62D 5/046 318/432 |
| 7,912,665 B2* | 3/2011 | Deng | B60K 28/06 702/109 |
| 8,405,496 B2 | 3/2013 | Bennett | |
| 8,983,732 B2 | 3/2015 | Lisseman et al. | |
| 9,013,269 B2 | 4/2015 | Hachisuka et al. | |
| 9,132,839 B1 | 9/2015 | Tan | |
| 9,342,074 B2 | 5/2016 | Dolgov et al. | |

(Continued)

FOREIGN PATENT DOCUMENTS

CN          105196911          12/2015

*Primary Examiner* — Jean Paul Cass
(74) *Attorney, Agent, or Firm* — Snell & Wilmer LLP

(57) ABSTRACT

Methods, systems, and apparatus for automatically regulating activation of one or more driving modes of a vehicle. The system includes a steering wheel sensor connected to a steering wheel and configured to detect whether two hands of a driver are in contact with the steering wheel. The system, includes a driving mode button configured to receive an indication from the driver to activate a driving mode, the driving mode adjusting at least one vehicle performance setting including a throttle sensitivity setting, a shift control setting, a traction control setting, or a stability control setting. The system includes an electronic control unit (ECU) configured to adjust the at least one vehicle performance setting in response to receiving the indication from the driver to activate the driving mode and receiving an indication from the steering wheel sensor that the two hands of the driver are in contact with the steering wheel.

20 Claims, 6 Drawing Sheets

(56) References Cited

U.S. PATENT DOCUMENTS

| | | | |
|---|---|---|---|
| 9,446,685 B2 | 9/2016 | Freienstein et al. | |
| 9,586,618 B2 | 3/2017 | Sham | |
| 9,751,534 B2 | 9/2017 | Fung et al. | |
| 9,809,169 B1 | 11/2017 | Naboulsi | |
| 9,840,275 B2 | 12/2017 | Trimboli et al. | |
| 9,889,873 B2 | 2/2018 | Lueke | |
| 9,896,123 B2* | 2/2018 | Maquire | B62D 1/046 |
| 9,919,708 B2* | 3/2018 | Pallett | B60W 50/082 |
| 10,081,317 B2* | 9/2018 | Naboulsi | H04M 1/6083 |
| 10,081,389 B2* | 9/2018 | Okuda | B62D 15/025 |
| 10,160,484 B2* | 12/2018 | Lee | G05D 1/0088 |
| 2003/0144801 A1* | 7/2003 | Braeuchle | B60Q 1/0076 702/56 |
| 2005/0131587 A1* | 6/2005 | Takamatsu | B60W 10/18 701/1 |
| 2008/0249685 A1* | 10/2008 | Hara | B62D 5/0466 701/42 |
| 2009/0294206 A1* | 12/2009 | Oblizajek | B62D 5/0472 180/446 |
| 2010/0108432 A1* | 5/2010 | Okazaki | B62D 5/0463 180/446 |
| 2010/0152952 A1* | 6/2010 | Lee | B62D 1/286 701/31.4 |
| 2010/0228417 A1* | 9/2010 | Lee | B62D 15/025 701/23 |
| 2012/0296505 A1* | 11/2012 | Igarashi | B60L 7/14 701/22 |
| 2012/0326735 A1* | 12/2012 | Bennett | B62D 1/046 324/705 |
| 2013/0158771 A1* | 6/2013 | Kaufmann | B62D 6/00 701/23 |
| 2013/0317699 A1* | 11/2013 | Urhahne | B62D 15/025 701/41 |
| 2013/0338881 A1* | 12/2013 | Sato | B60R 21/0134 701/45 |
| 2014/0024491 A1* | 1/2014 | Kobayashi | B60W 20/10 477/3 |
| 2014/0257628 A1* | 9/2014 | Lee | B62D 5/0481 701/34.4 |
| 2014/0379170 A1* | 12/2014 | Muetzel | B60W 30/182 701/2 |
| 2015/0051763 A1* | 2/2015 | Enomoto | B60L 11/1862 701/22 |
| 2015/0224845 A1* | 8/2015 | Anderson | B60G 17/052 701/37 |
| 2016/0303972 A1 | 10/2016 | Kuhne | |
| 2016/0323722 A1 | 11/2016 | Kovarik et al. | |
| 2016/0357186 A1 | 12/2016 | Dias | |
| 2017/0029021 A1* | 2/2017 | Lee | G05D 1/0088 |
| 2018/0244195 A1* | 8/2018 | Haight | G01S 13/931 |
| 2019/0068217 A1* | 2/2019 | Bannon | H03M 7/30 |
| 2019/0138018 A1* | 5/2019 | Cave | B60W 50/023 |
| 2019/0155678 A1* | 5/2019 | Hsiong | G06F 11/3055 |
| 2019/0168710 A1* | 6/2019 | Liau | B60R 22/48 |
| 2019/0176837 A1* | 6/2019 | Williams | B60W 50/02 |

* cited by examiner

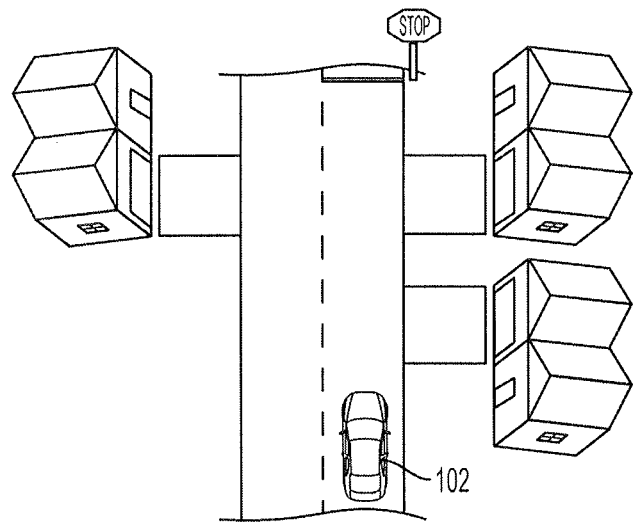
FIG. 1A
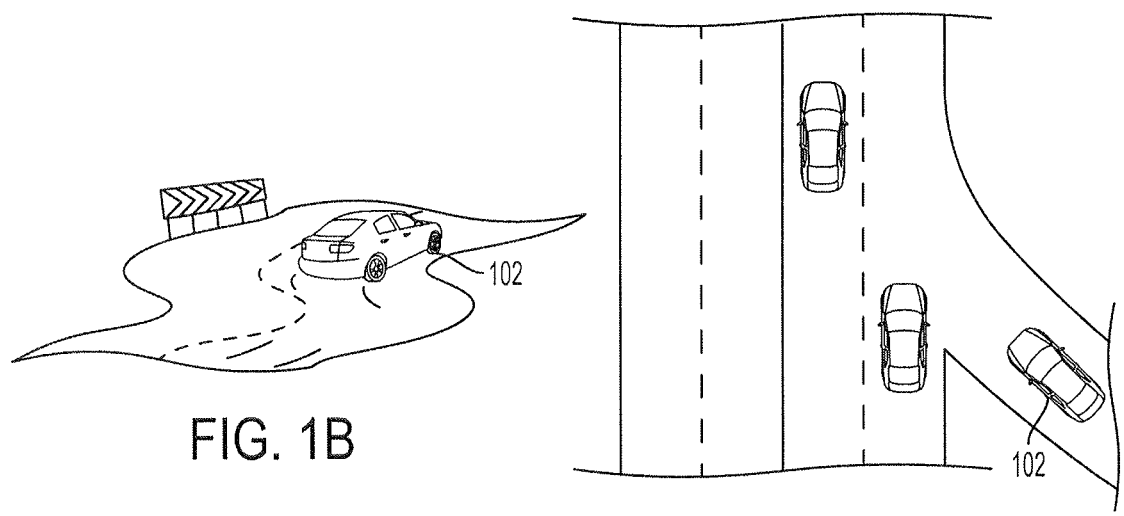
FIG. 1B
FIG. 1C

VEHICLE DRIVING MODE SAFETY SYSTEM

BACKGROUND

1. Field

This specification relates to a system and a method for automatically regulating whether a given vehicle driving mode should be activated.

2. Description of the Related Art

A vehicle may have a normal, default setting used in operation, where various operational settings of the vehicle are defined by the manufacturer. These settings may include a suspension tightness or a throttle sensitivity. Sports cars designed for high performance may have a tighter suspension and may be more responsive to engaging of the accelerator pedal, and family cars designed for comfort may have a softer suspension and may accelerate at a lower rate. Some vehicles may offer a "sport mode" which, when engaged, adjusts one or more aspects of the vehicle's operational settings to provide a "sportier" experience for the driver. However, a driver may not be capable of handling the changes in the vehicle's operation when the vehicle is in a "sport mode."

Therefore, there is a need for a system and a method for automatically regulating activation of one or more driving modes of a vehicle.

SUMMARY

What is described is a system for automatically regulating activation of one or more driving modes of a vehicle. The system includes a steering wheel sensor connected to a steering wheel and configured to detect whether two hands of a driver are in contact with the steering wheel. The system also includes a driving mode button configured to receive an indication from the driver to activate a driving mode, the driving mode adjusting at least one vehicle performance setting including a throttle sensitivity setting, a shift control setting, a traction control setting, or a stability control setting. The system also includes an electronic control unit (ECU) connected to the driving mode button and the steering wheel sensor and configured to adjust the at least one vehicle performance setting in response to receiving the indication from the driver to activate the driving mode and receiving an indication from the steering wheel sensor that the two hands of the driver are in contact with the steering wheel.

Also described is a method for automatically regulating activation of one or more driving modes of a vehicle. The method includes detecting, by a steering wheel sensor, whether two hands of the driver are in contact with the steering wheel. The method also includes receiving, by a driving mode button, an indication from a driver to activate a driving mode, the driving mode adjusting at least one vehicle performance setting including a throttle sensitivity setting, a shift control setting, a traction control setting, or a stability control setting. The method also includes adjusting, by an electronic control unit (ECU), the at least one vehicle performance setting in response to receiving the indication from the driver to activate the driving mode and receiving an indication from the steering wheel sensor that the two hands of the driver are in contact with the steering wheel.

Also described is a vehicle having one or more driving modes. The vehicle includes a sensor configured to detect whether the driver is in a controlled driving position. The vehicle also includes a driving mode button configured to receive an indication from the driver to change the driving mode from a current first driving mode to a desired second driving mode, the second driving mode adjusting at least one vehicle performance setting including a throttle sensitivity setting, a shift control setting, a traction control setting, or a stability control setting. The vehicle also includes an electronic control unit (ECU) connected to the driving mode button and the sensor, and configured to adjust the at least one vehicle performance setting in response to receiving the indication from the driver to change the driving mode and receiving an indication from the sensor that the driver is in the controlled driving position.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

FIGS. 1A-1C illustrate example situations for various driving modes of a vehicle, according to various embodiments of the invention.

DETAILED DESCRIPTION

Figure 2:
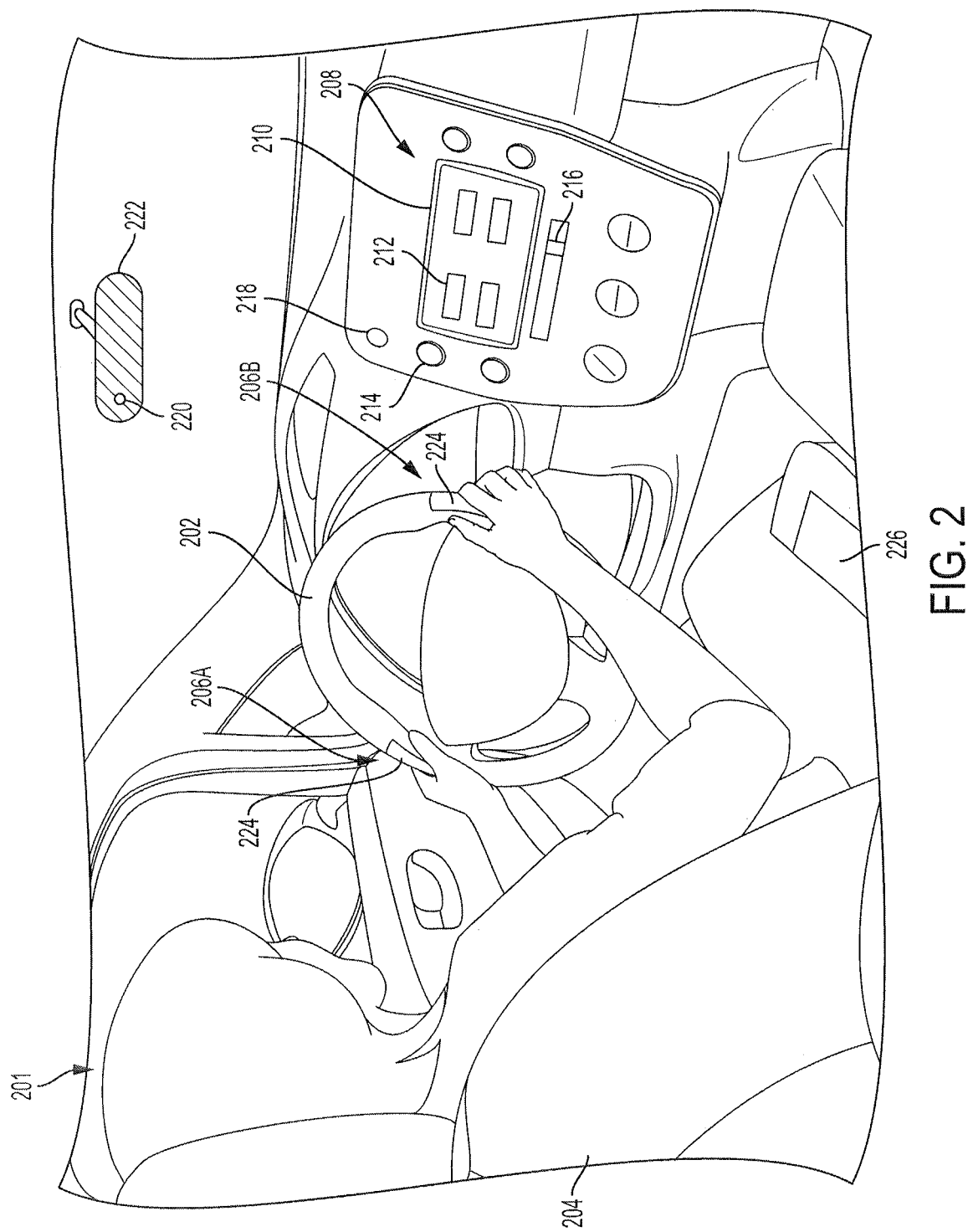
FIG. 2 illustrates an example vehicle driving mode safety system within a passenger cabin of a vehicle, according to various embodiments of the invention.

Disclosed herein are systems, vehicles, and methods for improving safety of vehicles capable of being operated in various driving modes, such as a sport driving mode. These vehicle modes, when engaged, adjust one or more operational settings of the vehicle. For example, when a sport mode is engaged, a suspension may become tighter than a normal, default setting. The changing from a normal, default mode to a sport mode or an eco-mode may be determined by the driver and manually changed by the driver. In many situations, however, the driver may not be prepared to operate the vehicle in the selected driving mode. For example, the driver may not be paying sufficient attention or may not be in a physical position to operate the vehicle in sport mode, and accordingly, the driver may perform maneuvers which the driver may be unable to handle.

The systems, vehicles, and methods described herein automatically determine whether the driver of the vehicle is capable of operating the vehicle in the new driving mode, and activating the new driving mode when the driver is determined to be capable. When the driver is determined to be not capable, the new driving mode is not activated. In some embodiments, external factors, such as weather, traffic conditions, vehicle operational conditions, and terrain conditions may be considered in whether the new driving mode is activated. By preventing operation of the vehicle in a mode the driver may not be capable of handling, the safety of the occupants of the vehicle is increased. In addition, the safety of the passengers of other vehicles and the safety of pedestrians are also increased.

FIG. 1A illustrates a vehicle 102 using a normal driving mode, whereby the operations of the vehicle 102 are not adjusted, and the vehicle 102 is operated according to the manufacturer's default specifications. The normal driving mode may be used in a residential area, where a variety of driving conditions may be possible, such as frequent stopping, extended stretches of low speed driving, and frequent turns.

FIG. 1B illustrates a vehicle 102 using a track driving mode, whereby the operations of the vehicle 102 are adjusted for extreme performance. In some embodiments, in the track driving mode, the suspension of the vehicle 102 is tightened, the throttle sensitivity is increased, the shift points are adjusted to hold gears for a longer period of time, the point at which traction control is engaged is increased to make the traction control engagement less likely, or the traction control is disabled entirely, and the point at which the stability control is engaged is increased to make the stability control engagement less likely, or the stability control is disabled entirely. If vehicle 102 is capable of all-wheel drive, it may be enabled in a track driving mode.

FIG. 1C illustrates a vehicle 102 using a sport driving mode, whereby the operations of the vehicle 102 are adjusted for increased performance. The types of adjustments may be similar to those made in the track driving mode, but made to a lesser degree. In some embodiments, in the sport driving mode, the suspension of the vehicle 102 is tightened, the throttle sensitivity is increased, the shift points are adjusted to hold gears for a longer period of time, the point at which the traction control is engaged is increased to make the traction control engagement less likely, and the point at which the stability control is engaged is increased to make the stability control engagement less likely. As shown in FIG. 1C, the vehicle 102 is on a freeway on-ramp, and the vehicle 102 may benefit from added throttle sensitivity when accelerating, and the vehicle 102 may also benefit from a tightening of suspension when traversing the curved portion of the freeway on-ramp.

The exemplary scenarios illustrated in FIGS. 1A-1C are merely illustrative and not limiting, and other situations may be possible where the driving modes of the vehicle 102 are used. For example, an economy (eco) driving mode may be used when the vehicle 102 is driving on a straight, empty or less congested road for an extended period of time.

As illustrated in FIGS. 1A-1C, a particular driving mode may be tailored for a particular location or a particular type of location. Further, the operational changes in the vehicle 102 under certain driving modes may be so different from the normal driving mode that safety features may be implemented for the safety of the passengers of the vehicle and for the safety of others on the road.

FIG. 2 illustrates the passenger cabin of a vehicle with a driver 201. The driver 201 is in the driver's seat 204 and is engaged with the steering wheel 202. The vehicle also has an infotainment unit 208 with a display screen 210. The display screen 210 may be a touchscreen configured to receive inputs from a user, or may simply be a display configured to output information to the user.

In some embodiments, the driving mode of the vehicle may be adjusted via the display screen 210 by touching or activating an icon 212. In some embodiments, the driving mode of the vehicle may be adjusted via a physical button 214 associated with a particular driving mode. In some embodiments, the driving mode of the vehicle may be adjusted by sliding a physical lever 216 to vary the operations of the vehicle from a less aggressive mode to a more aggressive mode. In some embodiments, the driving mode of the vehicle may be adjusted via a voice command received from a microphone 218.

There may be one or more sensors for determining whether the driver 201 is in a position to safely operate the vehicle. These one or more sensors may be used to determine whether it is safe and/or appropriate to adjust the driving mode of the vehicle. The sensors may be one or more steering wheel sensors 224 located on the steering wheel 202. The steering wheel sensors 224 are configured to detect whether a hand is in contact with the steering wheel 202. The steering wheel sensors 224 may be heat sensors configured to detect heat from the hands of the driver. The steering wheel sensors 224 may be pressure sensors configured to detect when the driver is gripping and applying pressure to the steering wheel 202. The steering wheel sensors 224 may be capacitive sensors configured to detect when the steering wheel 202 is being touched.

The steering wheel sensors 224 may be located in locations on the steering wheel 202 where the steering wheel sensors 224 are capable of detecting whether the driver's two hands are in a steering wheel control configuration. The steering wheel control configuration may be a placement of the driver's hands at a first location 206A and a second location 206B where the driver has control over the steering wheel 202, and consequently, the vehicle. The steering wheel control configuration may be defined analogously to the locations of the numbers on a clock. For example, the steering wheel control configuration may be achieved when the driver's hands are located at 2 o'clock and 10 o'clock or at 3 o'clock and 9 o'clock, for example. In some embodiments, the driver's hands may be between a particular range, such as the left hand being between 8 o'clock and 10 o'clock and the right hand being between 2 o'clock and 4 o'clock.

When the steering wheel sensors 224 detect that the driver's hands are on the steering wheel 202 (and additionally at certain locations on the steering wheel 202), the system described herein may be able to determine that the driver is in a physical position to adequately and capably steer the vehicle in the new driving mode (e.g., in the sport driving mode).

The sensors may be one or more image sensors 220 configured to detect a head and/or eye position of the driver 201. The image sensors 220 may be configured to capture image data, and the image data may be analyzed to determine whether the eyes of the driver 201 are facing or looking forward. The image data may also be analyzed to determine whether the head of the driver 201 is facing forward. When the image sensors 220 detect that the driver is facing forward, the system described herein may be able to determine that the driver is in a physical position to adequately and capably steer the vehicle in the new driving mode (e.g., in the sport driving mode). The image sensors 220 may be located anywhere in the passenger cabin facing the driver 201, for example, on the rear-view mirror 222.

The sensors may be one or more seat sensors 226 located in the driver's seat 204. The seat sensors 226 may be heat sensors configured to detect heat from the body of the driver. The seat sensors 226 may be pressure sensors configured to detect when the driver is sitting on the driver's seat 204. The seat sensors 226 may be configured to detect a weight distribution of the driver 201 within the driver's seat 204. In some embodiments, the new mode may not be activated unless the driver 201 is sitting with an upright posture whereby substantially equal weight is distributed by the driver's bottom (e.g., not sitting leaned over to the left or the right) and/or the driver 201 is sitting up straight (e.g., not hunched forward or leaned backwards). When the seat sensors 226 detect that the driver is in the driver's seat and/or in a particular posture, the system described herein may be able to determine that the driver is in a physical position to adequately and capably steer the vehicle in the new driving mode (e.g., in the sport driving mode).

In some embodiments, the steering wheel sensors 224, the image sensors 220, and/or the seat sensors 226 are configured to detect whether the driver is in a controlled driving position. The controlled driving position may be one or more of the two hands of the driver being on the steering wheel, the driver facing forward toward the road ahead of the vehicle, the driver having an upright posture, and/or the driver's head and/or eyes are facing or looking forward.

Figure 3:
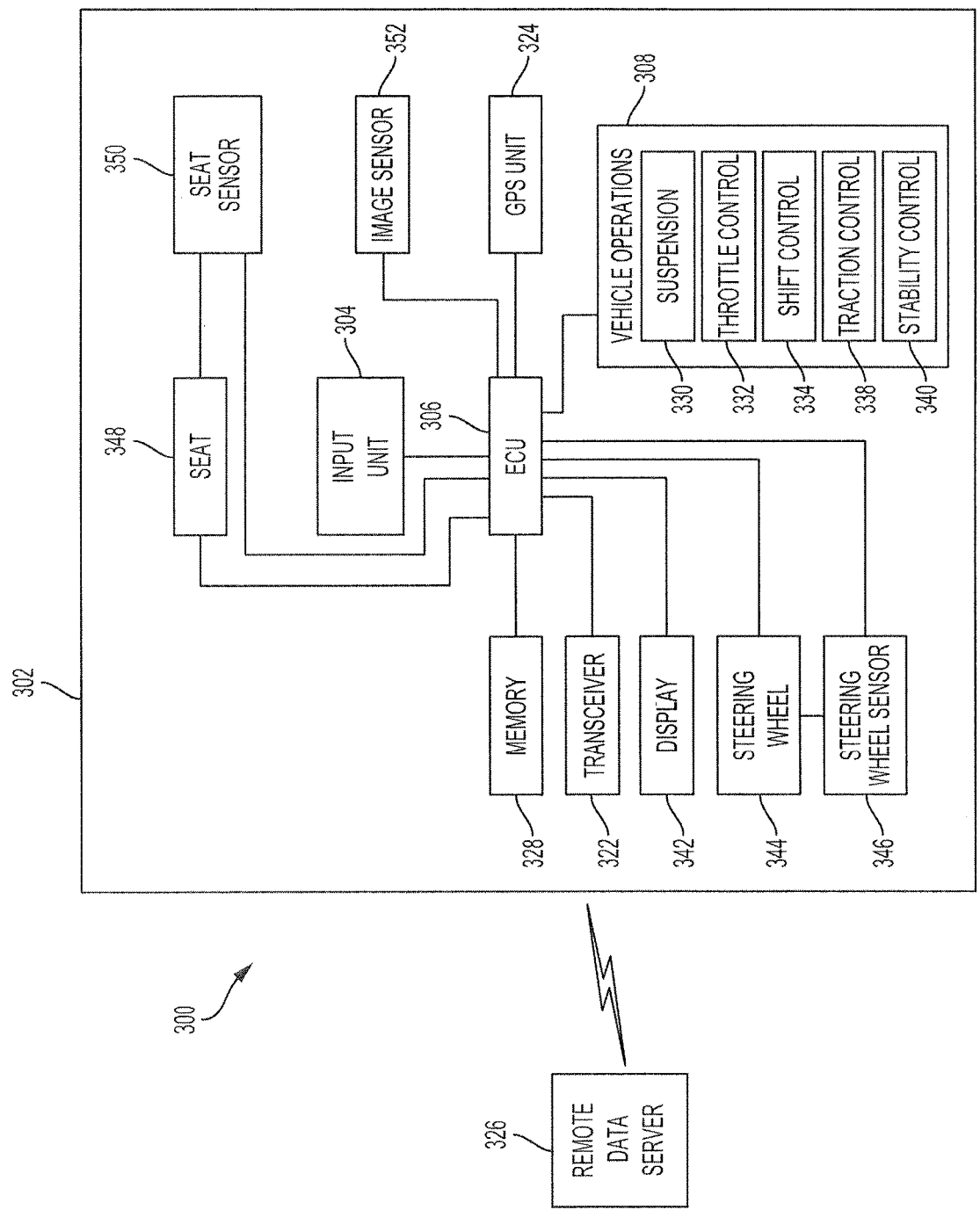
FIG. 3 is a block diagram of an example vehicle driving mode safety system, according to various embodiments of the invention.

FIG. 3 illustrates an example system 300, according to various embodiments of the invention. The system includes a vehicle 302 (e.g., the vehicle 102). The vehicle 302 may have an automatic or manual transmission. The vehicle 302 is a conveyance capable of transporting a person, an object, or a permanently or temporarily affixed apparatus. The vehicle 302 may be a self-propelled wheeled conveyance, such as a car, a sports utility vehicle, a truck, a bus, a van or other motor or battery driven vehicle. For example, the vehicle 302 may be an electric vehicle, a hybrid vehicle, a plug-in hybrid vehicle, a fuel cell vehicle, or any other type of vehicle that includes a motor/generator. Other examples of vehicles include bicycles, trains, planes, or boats, and any other form of conveyance that is capable of transportation. The vehicle 302 may be a semi-autonomous vehicle or an autonomous vehicle. That is, the vehicle 302 may be self-maneuvering and navigate without human input. An autonomous vehicle may use one or more sensors and/or a navigation unit to drive autonomously.

The system 300 also includes one or more computers or electronic control units (ECUs) 306, appropriately programmed, to control one or more operations of the vehicle. The one or more ECUs 306 may be implemented as a single ECU or in multiple ECUs. The ECU 306 may be electrically coupled to some or all of the components of the vehicle. In some embodiments, the ECU 306 is a central ECU configured to control one or more operations of the entire vehicle. In some embodiments, the ECU 306 is multiple ECUs located within the vehicle and each configured to control one or more local operations of the vehicle. In some embodiments, the ECU 306 is one or more computer processors or controllers configured to execute instructions stored in a non-transitory memory 328.

The vehicle 302 may include an input unit 304. The input unit 304 may be configured to receive input from a user, such as an occupant of the vehicle 302. The input unit 304 may be a touchscreen display of an infotainment unit, a microphone, a keyboard, a camera configured to detect motions, or one or more dials and/or buttons. The input unit 304 may be used to switch between various driving modes or to navigate between menu screens of a user interface.

The vehicle 302 may be coupled to a network. The network, such as a local area network (LAN), a wide area network (WAN), a cellular network, a digital short-range communication (DSRC), the Internet, or a combination thereof, connects the vehicle 302 to a remote data server 326. The remote data server 326 may be one or more servers from different service providers. Each of the one or more servers may be connected to one or more databases. A service provider may provide navigational map, weather and/or traffic data to the vehicle 302.

A database is any collection of pieces of information that is organized for search and retrieval, such as by a computer or a server, and the database may be organized in tables, schemas, queries, report, or any other data structures. A database may use any number of database management systems and may include a third-party server or website that stores or provides information. The information may include real-time information, periodically updated information, or user-inputted information. A server may be a computer in a network that is used to provide services, such as accessing files or sharing peripherals, to other computers in the network. A website may be a collection of one or more resources associated with a domain name.

The navigational map information includes political, roadway and construction information. The political information includes political features such as cities, states, zoning ordinances, laws and regulations, and traffic signs, such as a stop sign, or traffic signals. For example, laws and regulations may include the regulated speed on different portions of a road or noise ordinances. The roadway information includes road features such the grade of an incline of a road, a terrain type of the road, or a curvature of the road. The construction information includes construction features such as construction zones and construction hazards.

The traffic data includes one or more traffic condition features, such as traffic congested areas or accident areas. The traffic data may provide information related to the density and movement of vehicles on a roadway and/or accident locations.

The features, e.g., road features, political features, or traffic data, each have a location that may be identified by map coordinates. The map coordinates may be defined by latitude and longitude coordinates.

The transceiver 322 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G or 4G). The transceiver 322 may transmit data to and receive data from devices and systems not directly connected to the vehicle 302. For example, the ECU 306 may communicate with the remote data server 326. Furthermore, the transceiver 322 may access the network, to which the remote data server 326 is also connected.

In some embodiments, when the weather data indicates a current weather condition associated with a loss of traction (e.g., rain, snow, or sleet), the activation of the driving mode may be denied. For example, when the weather data indicates that it is currently raining where the vehicle is located, the sport driving mode may not be enabled for safety reasons.

In some embodiments, when the traffic data indicates that traffic congestion exceeds a threshold amount, the activation of the driving mode may be denied. For example, when the traffic data indicates that there is moderate-heavy traffic, the sport driving mode may not be enabled, as it may be too congested to safely drive in the sport driving mode. The threshold traffic congestion amount may be in terms based on the provided traffic data, and may be in units of measurement (e.g., average miles per hour of the vehicles in the area) or may be in terms of a relative index (e.g., no traffic, light traffic, moderate traffic, heavy traffic, or severe traffic).

The GPS unit 324 is connected to the ECU 306 and configured to determine location data. The ECU 306 may use the location data along with the map data to determine a location of the vehicle 302. In other embodiments, the GPS unit 324 has access to the map data and may determine the location of the vehicle 302 and provide the location of the vehicle 302 to the ECU 306.

The memory 328 is connected to the ECU 306 and may be connected to any other component of the vehicle 302. The memory 328 is configured to store any data described herein, such as the map data, the location data, and any data received from the remote data server 326 via the transceiver 322. The memory 328 is also configured to store the user's driving mode sensitivity preference. The memory 328 is also configured to store driving data associated with the vehicle 302 including, for example, accelerator pedal data, brake pedal data, steering wheel data, engine data, and transmission data. The driving data may additionally be associated with the location data received from the GPS unit 324. The ECU 306 may use the stored driving data and the location data to determine a particular driving mode which would be best suited for the driver based on the location of the vehicle or the type of environment.

The vehicle 302 may have a vehicle operations array 308 including multiple vehicle components each controlling one or more aspects of the vehicle 302. The vehicle operations array 308 includes a suspension 330, throttle control 332, shift control 334, traction control 338, and stability control 340.

The suspension 330 is configured to control aspects of the vehicle suspension, such as a suspension sensitivity. The suspension 330 may be an electronically controlled adjustable suspension, which may be able to adjust the tightness of the suspension of the vehicle 302. A tighter suspension may feel more responsive to the driver, but the comfort to the passengers may be reduced. A softer suspension may feel more comfortable to the passengers, but the driver may not feel as high of a level of responsiveness as compared to a tighter suspension.

The throttle control 332 is configured to control aspects of the throttle of the vehicle 302. When the vehicle 302 has an internal combustion engine, the throttle of the vehicle 302 controls an amount of air which is let into the engine, which controls a power and speed of the engine. When the vehicle 302 is an electric vehicle, the throttle may control an amount of electrical power delivered to the motor, from the power source, such as the battery. The throttle control 332 may be adjusted to be more or less sensitive. For example, when the throttle control 332 is adjusted to be more sensitive, an amount of accelerator pedal depression required to drive the vehicle 302 may be reduced. That is, when the throttle control 332 is more sensitive, the driver requires less accelerator pedal depression to propel the vehicle 302, resulting in a more responsive, more rapid possible acceleration of the vehicle 302. Conversely, when the throttle control 332 is less sensitive, the driver requires more accelerator pedal depression to propel the vehicle 302, resulting in a less responsive but more smooth and comfortable ride.

The shift control 334 is configured to control aspects of the gear shifting of the vehicle 302. The vehicle 302 may automatically shift to a higher gear when a particular rotations per minute is reached. The shift control 334 may increase the rotations per minute threshold when in certain driving modes so that the vehicle 302 may be held in a lower gear for a longer time. Holding the vehicle 302 in a lower gear as the vehicle 302 is rapidly accelerating may allow the engine to remain in a higher-power-outputting engine speed. In some situations, the shift control 334 may decrease the required rotations per minute threshold when in certain driving conditions to encourage shifting gears to increase fuel economy.

The traction control 338 is configured to control the traction of the vehicle 302. In particular, the traction control 338 adjusts a rate that one or more of the wheels spin at. When the traction control 338 is engaged, the spinning of the wheels may be slowed down when the wheels spin faster than they should be spinning. Accordingly, the traction control 338 slows down the wheels. When the traction control 338 is disengaged, the wheels may continue to spin despite a detected loss of traction to provide the driver with full control, assuming the driver will be able to handle the situation, or even assuming the driver intended for the loss of traction to occur, such as when the driver performs a sliding turn, commonly referred to as drifting.

The stability control 340 is configured to steer the vehicle 302 in a particular direction when traction is lost during a turn. In some regards, stability control is a form of traction control, whereby a coordinated series of brake engagements assists in steering the vehicle 302 when traction is lost. When the stability control 340 is fully engaged, the vehicle 302 may automatically steer itself in situations where traction is lost, and when the stability control 340 is reduced in sensitivity, the vehicle 302 may be allowed to slide in order to perform maneuvers, such as drifting.

The display 342 is configured to display the currently active driving mode, and/or which particular settings of the current driving mode are active. The display 342 may be part of an infotainment unit and may also present navigation instructions and may also provide a map of the current location of the vehicle 302 and/or a desired destination. The display 342 may include multiple display screens. For example, the display 342 may be two screens—one for displaying a map, and another for displaying a driving mode or settings of the driving mode.

The system 300 also includes a memory 328. The memory 328 is configured to store data described herein, such as any tables or equations used to determine whether to activate the desired driving mode. The memory 328 is also configured to store map data. The map data may indicate a terrain type (e.g., paved road, unpaved road, uneven terrain, inclined, declined) and/or a road type (e.g., surface street, freeway, residential, school zone).

The vehicle 302 includes a steering wheel 344 (e.g., the steering wheel 202) connected to a steering wheel sensor 346 (e.g., the steering wheel sensor 224). The steering wheel sensor 346 is configured to detect whether the steering wheel 344 is being contacted by the driver. In some embodiments, a driving mode is activated based on whether the steering wheel 344 is being contacted by the driver.

The vehicle 302 also includes a seat 348 (e.g., driver's seat 204) connected to a seat sensor 350 (e.g., the seat sensor 226). The seat sensor 350 is configured to detect whether the driver is in the seat 348 and/or the driver's weight distribution and posture. In some embodiments, a driving mode is activated based on the posture of the driver in the seat 348.

The vehicle 302 also includes an image sensor 352 (e.g., the image sensor 220). The image sensor 352 is configured to detect whether the driver is facing forward. As described herein, the image sensor 352 may track the eyes of the driver and/or the head location and orientation of the driver to determine whether the driver is facing forward toward the road. In some embodiments, a driving mode is activated based on whether the image sensor 352 detects that the driver is facing forward.

As used herein, a "unit" may refer to hardware components, such as one or more computer processors, controllers, or computing devices configured to execute instructions stored in a non-transitory memory.

Figure 4A:
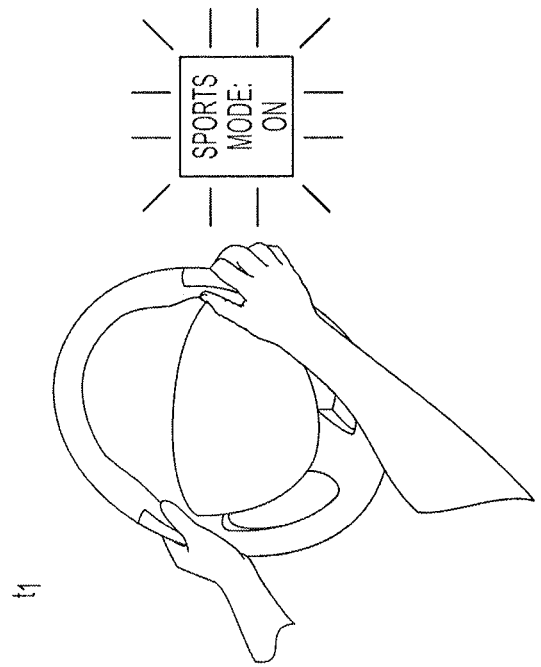
FIGS. 4A-4C illustrate a sequence of hand positions and corresponding driving mode states, according to various embodiments of the invention.

FIG. 4A illustrates a driver with both of the driver's hands on the steering wheel at time $t_0$. The driver's hands are in a steering wheel control configuration, being at locations analogous to 2 o'clock and 10 o'clock on a clock. At time $t_0$, the sports mode (also referred to as the sport driving mode) is off, as illustrated in FIG. 4A.

Figure 4B:
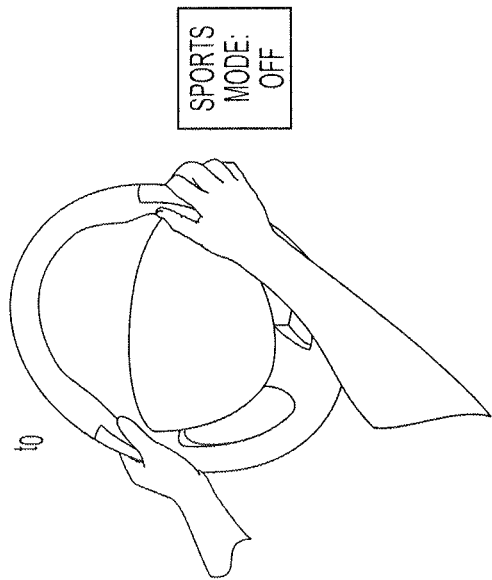

The driver may activate the sports mode using any number of methods, as described herein. FIG. 4B illustrates the sports mode being active at time $t_1$. Both of the driver's hands are on the steering wheel, which is detected by steering wheel sensors. Upon receiving the indication from the driver to activate the sports mode, the ECU determines whether the driver's hands are contacting the steering wheel. In some embodiments, when a button or a switch is used to activate the sports mode, there may be a window of time where the driver is allowed to not contact the steering wheel with both hands in order to activate the sports mode.

When the ECU determines that both of the driver's hands are contacting the steering wheel, the sports mode is activated. In some embodiments, alternatively or in addition, a seat sensor may detect the driver's posture and an image sensor may detect the driver's eye and/or head location, and any combination of these conditions may be required to be met in order for the sports mode to be activated.

Figure 4C:
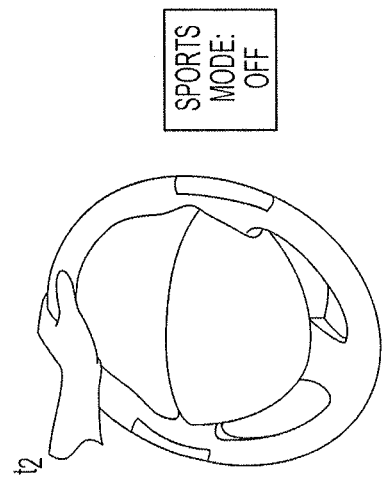

The sports mode may be activated for as long as the driver meets the established safety conditions. As shown in FIG. 4C, when the safety conditions include having both hands on the steering wheel, and the driver removes one of the driver's hands, the sports mode is automatically deactivated. In some embodiments, when the location of the hands on the steering wheel is also specified in the safety conditions, the sports mode may also be automatically deactivated by the driver in FIG. 4C, when the driver removes the driver's left hand from the 10 o'clock location on the steering wheel.

If the driver were to place both hands back on the steering wheel, in some embodiments, the sports mode would automatically turn back on if both hands were placed back on the steering wheel within a threshold amount of time. In other embodiments, once the sports mode is deactivated, the driver must then re-activate the sports mode and must also meet the established safety conditions.

Figure 5:
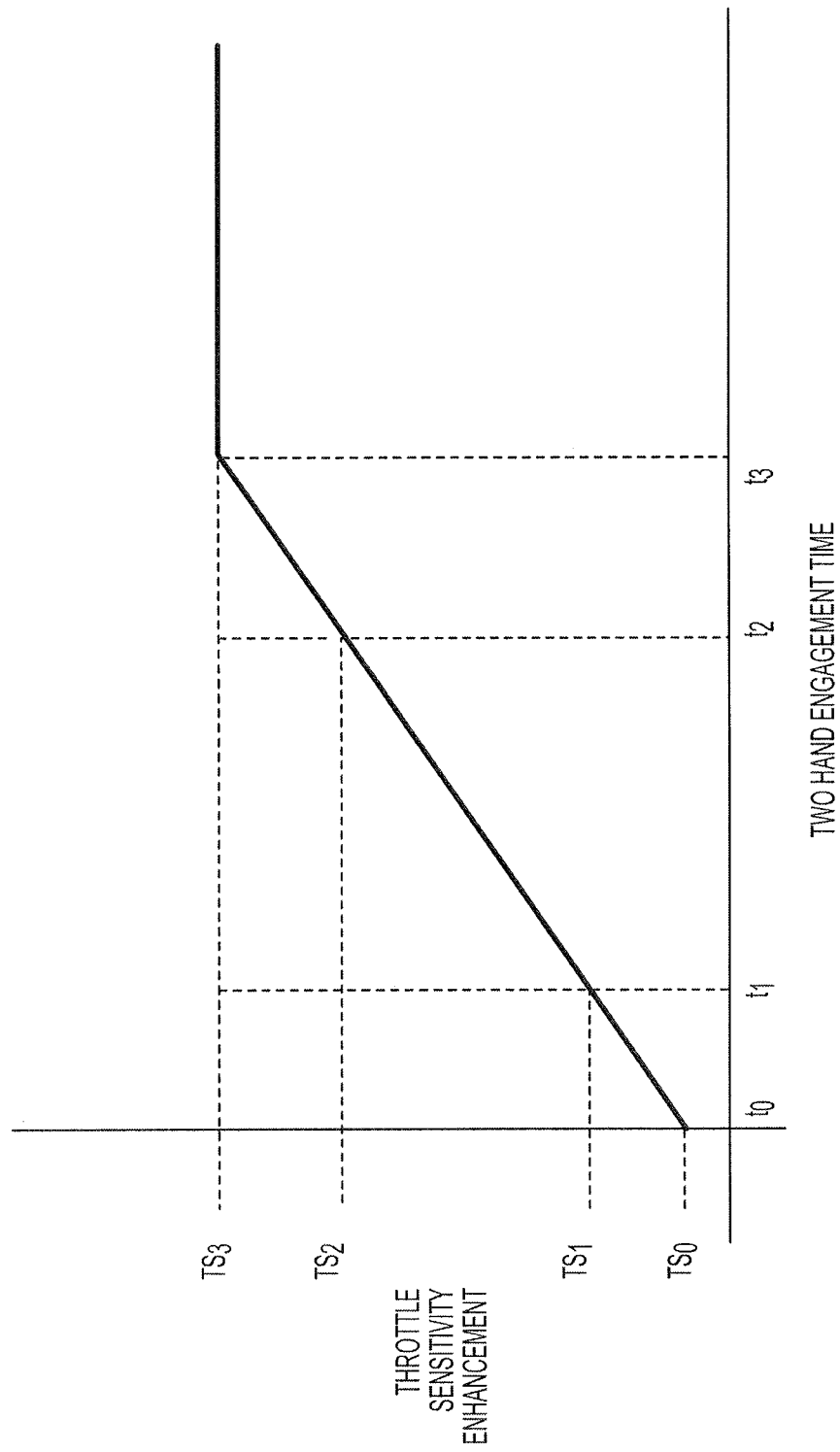
FIG. 5 illustrates a graph of throttle sensitivity enhancement based on two-hand engagement time, according to various embodiments of the invention.

In some embodiments, the longer the driver has the driver's hands on the steering wheel, the more the vehicle's operation may be adjusted. For example, the longer both the driver's hands are on the steering wheel, the greater the throttle sensitivity may be increased when the vehicle is operating in the sports mode. This is illustrated in FIG. 5.

Before time $t_0$, the driver does not have both hands on the steering wheel. Accordingly, if the sports mode was activated, there would be no enhancement of the throttle sensitivity. The line of the graph illustrates a throttle sensitivity enhancement provided to the operation of the vehicle upon the sports mode being activated.

For example, when the driver has both hands on the steering wheel starting at time $t_0$, and the sports mode is activated at time $t_0$, the throttle sensitivity is enhanced by a multiplier $TS_0$. $TS_0$ may be a minimum amount of increase to throttle sensitivity. In some embodiments, throttle sensitivity is enhanced by adjusting the drive force map of the vehicle, which provides a throttle for a given pedal input.

If the sports mode activation is received at time $t_1$, the throttle sensitivity is enhanced by a multiplier $TS_1$, which is greater than $TS_0$. In this way, the longer the driver has the driver's two hands in contact with the steering wheel, the greater the throttle sensitivity enhancement.

Similarly, when the sports mode activation is received at time $t_2$, the throttle sensitivity is enhanced by a multiplier $TS_2$, which is greater than $TS_1$. Eventually, there may be an upper limit to the amount the throttle sensitivity may be enhanced by. This is shown at time $t_3$ and is represented by throttle sensitivity $TS_3$.

In some embodiments, as the driver maintains both hands on the steering wheel, the throttle sensitivity may continue to increase until the upper limit is reached. For example, if the sports mode was activated at time $t_1$, the throttle sensitivity would continue to rise through times $t_2$ and $t_3$. In this way, the driver is rewarded for maintaining both hands on the steering wheel.

In some embodiments, the throttle sensitivity reached at the time the sports mode is activated is the throttle sensitivity which will continue to be used. For example, if the sports mode is activated at time $t_1$, the throttle sensitivity $TS_1$ is used continuously until the sports mode is deactivated.

In some embodiments, a threshold two-hand engagement time must be exceeded for the sports mode to be activated. For example, if the threshold two-hand engagement time is an amount of time $t_1$, the sports mode would not activate if the sports mode activation indication is received at time $t_0$, as the threshold two-hand engagement time is not exceeded at time $t_0$. However, the sports mode would activate if the sports mode activation indication is received at time $t_2$ or $t_3$, as $t_2$ and $t_3$ exceed the threshold two-hand engagement time $t_1$.

While FIG. 5 illustrates the throttle sensitivity being adjusted when the sports mode is activated, any one of the various vehicle performance settings, such as shift control setting, traction control setting, or stability control setting may be adjusted instead or in addition. Further, while the driving mode is illustrated as being the sports mode, the same conditions may be applied to activating any other driving mode.

In some embodiments, when activation of a particular driving mode is refused, a display or a speaker provides an indication to the driver that the driving is refused and instructions of what the driver should do to enable the driving mode.

Figure 6:
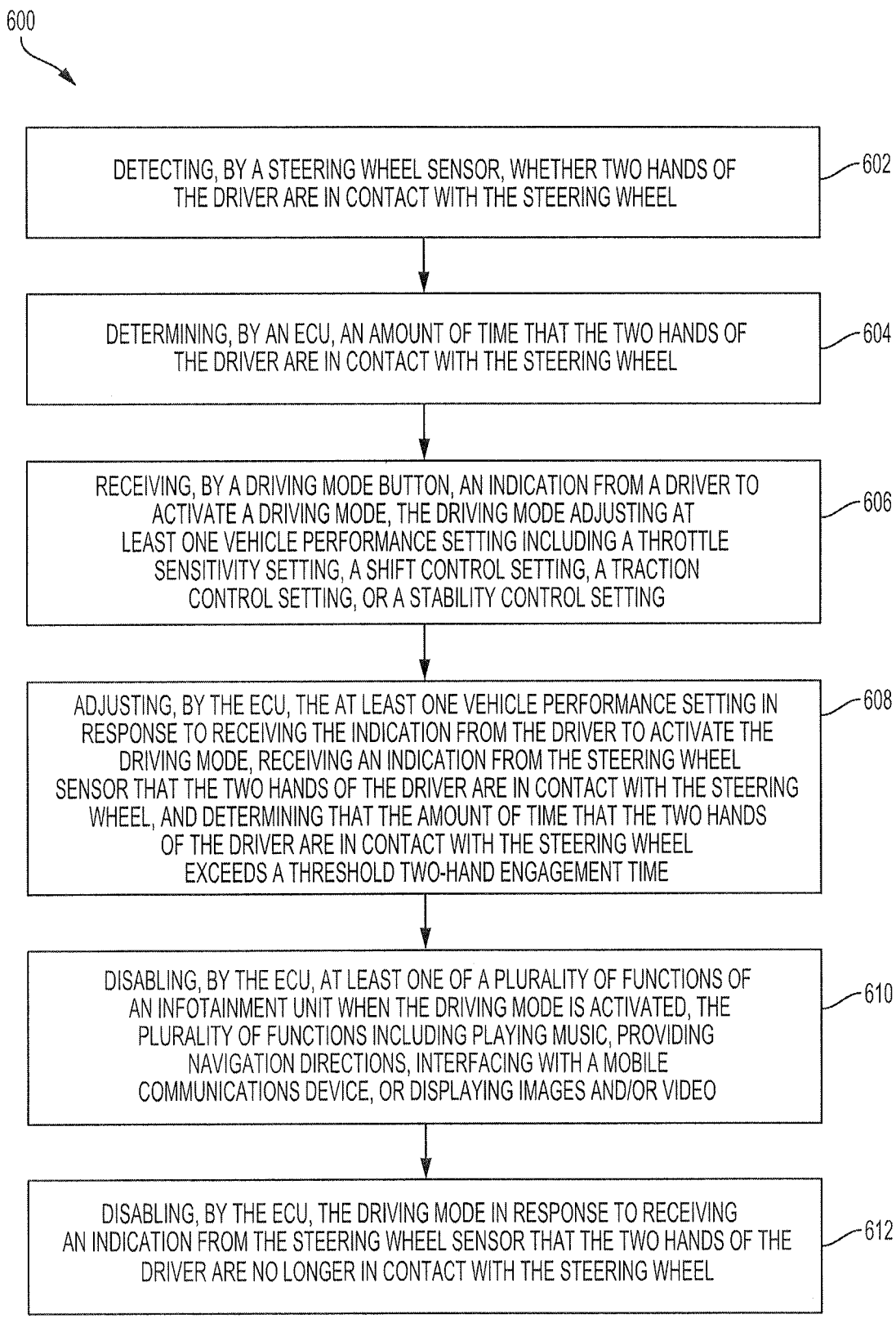
FIG. 6 illustrates a flow diagram of a process performed by the vehicle driving mode safety system, according to various embodiments of the invention.

FIG. 6 is a flow diagram of a process 600 of the system disclosed herein. The steering wheel sensor (e.g., the steering wheel sensor 346) detects whether two hands of the driver are in contact with the steering wheel (e.g., the steering wheel 344) (step 602). In some embodiments, an image sensor (e.g., the image sensor 352) detects whether the driver is facing forward alternatively or in addition to detecting whether the driver is contacting the steering wheel with both hands. In some embodiments, a seat sensor (e.g., the seat sensor 350) detects the posture of the driver alternatively or in addition to detecting whether the driver is contacting the steering wheel with both hands.

An ECU (e.g., the ECU 306) determines an amount of time that the two hands of the driver are in contact with the steering wheel (step 604). The steering wheel sensors may continuously detect whether both of the driver's hands are in contact with the steering wheel. The two-hand engagement time may be tracked over time, and the amount of time that the two hands of the driver are in contact with the steering wheel may be expressed as a ratio of two-hand engagement time over total time. For example, if the driver is contacting the steering wheel with both hands for 5 minutes, released one hand for 10 seconds, and contacted the steering wheel for another 2 minutes, the amount of time that the two hands of the driver are in contact with the steering wheel may be 7 minutes out of the past 7 minutes and 10 seconds, or 420/430 seconds, or 97.67 percent of the past 7 minutes and 10 seconds.

A driving mode button coupled to the ECU receives an indication from the driver to activate a driving mode (step 606). The driving mode adjusts at least one vehicle performance setting including a throttle sensitivity setting, a shift control setting, a traction control setting, or a stability control setting. The driving mode may be a sport driving mode, an economy (eco) driving mode, or a track driving mode, for example.

The driving mode button may be a physical button, lever or knob. The driving mode button may be a selectable icon displayed on the display screen inside the vehicle. The driving mode button may be a voice-activatable button capable of being activated by an audio command from the driver.

The ECU adjusts at least one vehicle performance setting in response to receiving the indication to activate the driving mode, receiving an indication from the steering wheel sensor that the two hands of the driver are in contact with the steering wheel, and determining that the amount of time that the two hands of the driver are in contact with the steering wheel exceeds a threshold two-hand engagement time (step 608). In some embodiments, both of the conditions of (1) the two hands of the driver being in contact with the steering wheel and (2) the amount of time that the two hands of the driver are in contact with the steering wheel exceeding the threshold two-hand engagement time must be met in order for the driving mode to be activated. In other embodiments, only one of the two conditions above must be met in order for the driving mode to be activated.

In some embodiments, the ECU receives traffic data, weather data, and/or vehicle status data (e.g., battery state of charge, tire pressure, door lock status, or engine oil status). Based on the traffic data, weather data, and/or vehicle status data, the ECU may not allow the driving mode to be activated. For example, when at least one of: the traffic data indicates heavy traffic, the weather data indicates a traction loss environment, the vehicle status data indicates battery state of charge below a battery state of charge threshold, the vehicle status data indicates tire pressure below a tire pressure threshold, the vehicle status data indicates door lock status indicating one or more doors are not locked, and/or the vehicle status data indicates engine oil quality is below an engine oil threshold, the driving mode may not be activated.

The ECU disables at least one of a plurality of functions of an infotainment unit when the driving mode is activated (step 610). The plurality of functions may include playing music, providing navigation directions, interfacing with a mobile communications device, such as a smartphone, or displaying images and/or video. At least one of the functions of the infotainment unit may be disabled to prevent the driver from being distracted while driving in the driving mode, which may be an enhanced performance driving mode, such as the sport mode.

The ECU disables the driving mode in response to receiving an indication from the steering wheel sensor that the two hands of the driver are no longer in contact with the steering wheel (step 612). When the driving mode is disabled, a default performance setting of the vehicle may be used.

In some embodiments, the ECU disables the driving mode when the two hands of the driver are not in contact with the steering wheel for a threshold amount of time. For example, when the threshold amount of time is 30 seconds, the driver may temporarily remove one of the driver's hands for under 30 seconds and still remain in the driving mode. In some embodiments, when the driver removes both hands for any amount of time, the driving mode is automatically disabled.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for automatically regulating activation of one or more driving modes of a vehicle, the system comprising:
   a steering wheel sensor connected to a steering wheel and configured to detect whether two hands of a driver are in contact with the steering wheel;
   a driving mode button configured to be engaged by the driver to activate a driving mode, the driving mode adjusting a traction control setting and a stability control setting; and
   an electronic control unit (ECU) connected to the driving mode button and the steering wheel sensor and configured to:
      adjust the traction control setting and the stability control setting when the driving mode button is engaged by the driver to activate the driving mode and when the steering wheel sensor detects that the two hands of the driver are in continuous contact with the steering wheel for a predetermined threshold time, indicating that the driver is prepared to operate the vehicle when the driving mode is activated,
      prevent adjusting of the traction control setting and the stability control setting when the steering wheel sensor detects that fewer than two hands of the driver are in contact with the steering wheel, and
      provide an alert when the activation of the driving mode is prevented.

2. The system of claim 1, wherein the driving mode is a sport driving mode, and
   wherein adjusting the traction control setting and the stability control setting includes decreasing traction control sensitivity and decreasing stability control sensitivity.

3. The system of claim 1, wherein the steering wheel sensor is configured to detect whether the two hands of the driver are contacting the steering wheel in a steering wheel control configuration.

4. The system of claim 1, further comprising a transceiver configured to receive, from a remote server, at least one of weather data or traffic data, and
   wherein the ECU is configured to adjust vehicle performance settings based on the weather data and/or the traffic data.

5. The system of claim 1, further comprising at least one of a battery state of charge sensor, a tire pressure sensor, a door lock sensor, or an engine oil sensor, and wherein the ECU is configured to adjust vehicle performance settings based on state of charge data from the battery state of charge sensor, tire pressure data from the tire pressure sensor, door lock data from the door lock sensor, or engine oil data from the engine oil sensor.

6. The system of claim 1, further comprising an infotainment unit located within a passenger cabin of the vehicle configured to provide a plurality of functions including playing music, providing navigation directions, interfacing with a mobile communications device, or displaying images and/or video, and
wherein the ECU is further configured to disable at least one of the plurality of functions of the infotainment unit when the driving mode is activated.

7. The system of claim 1, wherein the ECU is further configured to determine an amount of time that the two hands of the driver are in contact with the steering wheel prior to the driving mode button being engaged by the driver to activate the driving mode, and
wherein the adjusting the traction control setting and the stability control setting is additionally in response to the amount of time that the two hands of the driver are in contact with the steering wheel exceeding a threshold two-hand engagement time.

8. The system of claim 7, wherein a degree of adjustment of the traction control setting and the stability control setting is based on the amount of time that the two hands of the driver are in contact with the steering wheel.

9. The system of claim 1, wherein the ECU is further configured to disable the driving mode in response to receiving an indication from the steering wheel sensor that the two hands of the driver are no longer in contact with the steering wheel.

10. The system of claim 1, wherein the driving mode button is a physical button, a physical switch, a physical sliding lever, a selectable icon on a touchscreen display, or a voice-activated button.

11. The system of claim 1, wherein the ECU is further configured to:
determine, after the driving mode is activated, whether at least one hand of the driver is removed from the steering wheel,
when the at least one hand of the driver is removed from the steering wheel for at least a threshold temporary removal time, disable the driving mode, and
when the at least one hand of the driver is removed from the steering wheel for a duration under the threshold temporary removal time, maintain the driving mode.

12. A method for automatically regulating activation of one or more driving modes of a vehicle, the method comprising:
detecting, by a steering wheel sensor, whether two hands of the driver are in contact with the steering wheel;
receiving, by a driving mode button, an indication from a driver to activate a driving mode, the driving mode adjusting a traction control setting and a stability control setting;
adjusting, by an electronic control unit (ECU), the traction control setting and the stability control setting when the driving mode button is engaged to activate the driving mode and when the steering wheel sensor detects that the two hands of the driver are in continuous contact with the steering wheel for a predetermined threshold time, indicating that the driver is prepared to operate the vehicle when the driving mode is activated;
preventing, by the ECU, adjusting of the traction control setting and the stability control setting when the steering wheel sensor detects that fewer than two hands of the driver are in contact with the steering wheel; and
providing, by the ECU, an alert when the activation of the driving mode is prevented.

13. The method of claim 12, wherein the driving mode is a sport driving mode, and
wherein adjusting the traction control setting and the stability control setting includes decreasing traction control sensitivity and decreasing stability control sensitivity.

14. The method of claim 12, wherein detecting whether the two hands of the driver are contacting the steering wheel further comprises detecting whether the two hands of the driver are in a steering wheel control configuration.

15. The method of claim 12, further comprising disabling, by the ECU, at least one of a plurality of functions of an infotainment unit when the driving mode is activated, the plurality of functions including playing music, providing navigation directions, interfacing with a mobile communications device, or displaying images and/or video.

16. The method of claim 12, further comprising disabling, by the ECU, the driving mode in response to receiving an indication from the steering wheel sensor that the two hands of the driver are no longer in contact with the steering wheel.

17. The method of claim 12, wherein a degree of adjustment of the traction control setting and the stability control setting is based on the amount of time that the two hands of the driver are in contact with the steering wheel.

18. The method of claim 12, further comprising:
determining, by the ECU, after the driving mode is activated, whether at least one hand of the driver is removed from the steering wheel;
disabling, by the ECU, the driving mode when the at least one hand of the driver is removed from the steering wheel for at least a threshold temporary removal time; and
maintaining the driving mode when the at least one hand of the driver is removed from the steering wheel for a duration under the threshold temporary removal time.

19. A vehicle having one or more driving modes, the vehicle comprising:
a steering wheel sensor configured to detect whether two hands of the driver are in contact with the steering wheel;
a driving mode button configured to receive an indication from the driver to change driving mode from a current first driving mode to a desired second driving mode, the second driving mode adjusting a traction control setting and a stability control setting; and
an electronic control unit (ECU) connected to the driving mode button and the steering wheel sensor, and configured to:
adjust the traction control setting and the stability control setting when the driving mode button receives the indication from the driver to change driving mode and when the sensor detects that the two hands of the driver are in continuous contact with the steering wheel for a predetermined threshold time, indicating that the driver is prepared to operate the vehicle when the driving mode is activated,
prevent adjusting of the traction control setting and the stability control setting when the steering wheel sensor detects that fewer than two hands of the driver are in contact with the steering wheel, and provide an alert when the activation of the second driving mode is prevented.

20. The vehicle of claim 19, wherein the ECU is further configured to disable the second driving mode or change driving mode from the second driving mode to the first driving mode in response to receiving an indication from the sensor that the two hands of the driver are no longer in a controlled driving position.

\* \* \* \* \*